United States Patent
Maeno

(10) Patent No.: US 8,564,474 B2
(45) Date of Patent: Oct. 22, 2013

(54) METHOD AND PROGRAM FOR SETTING THRESHOLD, AND METHOD, PROGRAM AND DEVICE FOR DETECTING TARGET OBJECT

(75) Inventor: Hitoshi Maeno, Nishinomiya (JP)

(73) Assignee: Furuno Electric Company Limited, Nishinomiya (JP)

(*) Notice: Subject to any disclaimer, the term of this patent is extended or adjusted under 35 U.S.C. 154(b) by 153 days.

(21) Appl. No.: 13/176,684

(22) Filed: Jul. 5, 2011

(65) Prior Publication Data
US 2012/0007766 A1    Jan. 12, 2012

(30) Foreign Application Priority Data
Jul. 6, 2010   (JP) ................................. 2010-153798

(51) Int. Cl.
*G01S 13/00*   (2006.01)

(52) U.S. Cl.
USPC ................. 342/91; 342/92; 342/93; 342/118; 342/159

(58) Field of Classification Search
USPC ................ 342/73, 89–93, 139, 159, 162, 203
See application file for complete search history.

(56) References Cited

U.S. PATENT DOCUMENTS

| | | | | |
|---|---|---|---|---|
| 4,213,127 A * | 7/1980 | Cole | | 342/93 |
| 5,337,055 A * | 8/1994 | Ghignoni | | 342/93 |
| 5,357,256 A * | 10/1994 | Peperone | | 342/160 |
| 5,539,412 A * | 7/1996 | Mendelson | | 342/192 |
| 7,336,219 B1 * | 2/2008 | Lohmeier et al. | | 342/159 |
| 7,990,309 B2 * | 8/2011 | Watts | | 342/93 |
| 8,013,781 B2 * | 9/2011 | Stockmann | | 342/93 |
| 2009/0058713 A1 * | 3/2009 | Okunishi et al. | | 342/91 |
| 2010/0321231 A1 * | 12/2010 | Nakahama | | 342/118 |

FOREIGN PATENT DOCUMENTS

| | | | |
|---|---|---|---|
| JP | 2002-243842 A | 8/2002 | |
| JP | 2003-172777 A | 6/2003 | |

* cited by examiner

*Primary Examiner* — John B Sotomayor
*Assistant Examiner* — Marcus Windrich
(74) *Attorney, Agent, or Firm* — Birch, Stewart, Kolasch & Birch, LLP

(57) ABSTRACT

This disclosure provides a method of setting a threshold according to a level of an echo signal of an unused component. The echo signals are generated by transmitting and receiving a radio wave with an antenna while the antenna revolves. The method of setting the threshold includes calculating a difference value between a level of the echo signal at an observing position and a level of the echo signal at a position comparatively on the antenna side and close to the observing position, selecting a process for setting a threshold from either one of a first threshold setting process and a second threshold setting process according to the difference value, and updating the threshold for the observing position by using the selected threshold setting processing.

17 Claims, 12 Drawing Sheets

METHOD AND PROGRAM FOR SETTING THRESHOLD, AND METHOD, PROGRAM AND DEVICE FOR DETECTING TARGET OBJECT

CROSS-REFERENCE TO RELATED APPLICATION(S)

The application claims priority under 35 U.S.C. §119 to Japanese Patent Application No. 2010-153798, which was filed on Jul. 6, 2010 the entire disclosure of which is hereby incorporated by reference.

TECHNICAL FIELD

The present invention relates to a method of automatically setting a threshold for detecting a target object on the sea and a land by using a radio wave, and further relates to a method of detecting the target object by using the method of automatically setting the threshold.

BACKGROUND OF THE INVENTION

Conventionally, various target object detection devices for transmitting radio waves to detect a target object based on the echo signals of the transmitted radio waves have devised. In such target object detection devices, for example a target object detection device equipped in a ship, there may be a case necessary to discriminate unused components such as clutters, for example a sea clutter and a rain clutter, and a noise, from a target object such as another ship and a land.

For example, JP2003-172777A discloses a target detection system in which a clutter factor is detected from observational data stored in a radar map memory so as to determine a clutter level. Further, information on reliability of the observational data is provided to a user of the system according to the determined clutter level.

As a method of detecting the clutter level, JP2002-243842A discloses a detection device in which a clutter level mainly including a sea clutter is detected from a reception signal caused by a transmission pulse.

However, as shown in the above conventional arts, not only the sea clutter but a rain clutter also exists as the clutter. In the arts disclosed in JP2003-172777A and JP2002-243842A, an appropriate condition is not set for each of the plurality of clutters and, therefore, an accurate threshold cannot be set for each of the clutters.

SUMMARY OF THE INVENTION

Therefore, the present invention is made in view of the situations as described above, and provides a method of automatically setting a threshold that can accurately distinguish a sea clutter as well as a rain clutter from a target object.

According to an aspect of the invention, a method of setting a threshold according to a level of an echo signal of an unused component is provided. The echo signals are generated by transmitting and receiving a radio wave with an antenna while the antenna revolves. The method of setting the threshold includes calculating a difference value between a level of the echo signal at an observing position and a level of the echo signal at a position comparatively on the antenna side and close to the observing position, selecting a process for setting a threshold from either one of a first threshold setting process and a second threshold setting process according to the difference value, and updating the threshold set for the observing position by using the selected threshold setting processing.

In this method, the setting process of the threshold is differentiated based on the difference value between the level of the echo signal at the observing position and the level of the echo signal at the position comparatively on the antenna side and close to the observing position. Thereby, the threshold is adaptively set according to existences of clutters, a noise and the target object.

The selecting the threshold setting process may include selecting the first threshold setting process when the difference value is above the threshold and selecting the second threshold setting process when the difference value is below the threshold. When the first threshold setting process is selected, the updating the threshold may include updating the threshold set for the observing position based on the level of the echo signal at the observing position, the threshold set for the observing position, and a threshold set for the position comparatively on the antenna side and close to the observing position. When the second threshold setting process is selected, the updating the threshold may include updating the threshold set for the observing position based on the level of the echo signal at the observing position and the threshold set for the observing position.

As described above, the contents of the first threshold setting process and the second threshold setting process which are selected based on the difference value are described in detail.

The first threshold setting process may include decreasing the threshold set for the observing position when the level of the echo signal at the observing position is below the threshold set for the observing position. The first threshold setting process may also include increasing the threshold set for the observing position when the level of the echo signal at the observing position is above the threshold set for the observing position and the threshold set for the position comparatively on the antenna side and close to the observing position is above the threshold set for the observing position. The first threshold setting process may further include decreasing the threshold set for the observing position when the level of the echo signal at the observing position is above the threshold set for the observing position and the threshold set for the position comparatively on the antenna side and close to the observing position is below the threshold set for the observing position.

As described above, the process contents of the first threshold setting process is described in detail. When the level of the echo signal at the observing position is below the threshold, the threshold level is decreased. On the other hand, when the level of the echo signal at the observing position is above the threshold, the threshold is varied based on the comparison result between the threshold set for the observing position and the threshold set for the position comparatively on the antenna side and close to the observing position on the same sweep. Specifically, the threshold is increased when the threshold set for the observing position is below the threshold set for the close position. On the other hand, the threshold set for the observing position is decreased when the threshold is above the threshold set for the close position.

The second threshold setting process may include decreasing the threshold set for the observing position when the level of the echo signal at the observing position is below the threshold set for the observing position. The second threshold setting process may include increasing the threshold set for the observing position when the level of the echo signal at the observing position is above the threshold set for the observing position.

As described above, the process contents of the second threshold setting process is described in detail. When the level of the echo signal at the observing position is below the threshold, the threshold is decreased. On the other hand, when the level of the echo signal at the observing position is above the threshold, the threshold is increased. That is, the threshold is varied simply based on the comparison result between the level of the echo signal at the observing position and the threshold without reference to the comparison result between the threshold set for the observing position and the threshold set for the close position.

The calculating the difference value may include correcting the difference value according to the level of the echo signal at the observing position. The selecting the threshold setting process may include selecting the threshold setting process based on the corrected difference value.

In this method, the difference value is appropriately corrected according to the level of the echo signal.

The difference value may be corrected to be larger as the level of the echo signal at the observing position is higher.

As described above, the method of correcting the difference value is described in detail.

The difference value may be corrected by a weighted addition of a maximum value and a minimum value of the level of the echo signal by using a weight coefficient corresponding to the level of the echo signal at the observing position.

As described above, the method of correcting the difference value is described further in detail.

The method of setting the threshold may further include updating a threshold along a distance direction in parallel to a discharging direction of the radio wave having the antenna as a reference position, for a plurality of particular azimuth directions set every predetermined azimuth angle along a revolving direction of the antenna, and interpolating the threshold along the distance direction in an individual azimuth direction different from the particular azimuth directions based on the thresholds set for two of the particular azimuth directions interposing the individual azimuth direction therebetween.

As described above, not the method of setting the threshold along the distance direction simply in a single azimuth direction but the method of setting the threshold over the entire peripheral of the revolution of the antenna is described. That is, although the adaptive setting of the threshold for each position along the distance direction in the single azimuth direction may be performed for the entire azimuth direction, the setting of the threshold may be performed by the other method. In this method, the threshold setting is performed only in the particular azimuth directions set every predetermined azimuth angle within the entire peripheral azimuth direction. Further, in the individual azimuth directions which are different from the particular azimuth directions, the threshold setting is performed by using the thresholds in the particular azimuth directions.

The interpolating the threshold may include weighting with azimuth angle differences between the individual azimuth direction and the two particular azimuth directions, the thresholds set for the two particular azimuth directions at the same distance position.

As described above, the specific contents of the interpolation in the method of setting the threshold over the entire periphery is described.

According to another aspect of the invention, a method of detecting a target object is provided, which includes the method of any of the aspects described above, and determining that the echo signal with a level higher than the set threshold is an echo signal of the target object.

In this method, the threshold is set adaptively to situations and, therefore, the target object echo can further accurately be discriminated.

According to another aspect of the invention, a method of detecting a target object is provided, which includes the method of any of the aspects described above, and creating detection image data from which the echo signal with a level lower than the set threshold is suppressed.

In this method, the threshold is set adaptively to situations and, therefore, the echo signal of an unused component can further accurately be suppressed.

According to the aspects of the invention, the threshold can accurately be set for any one of a sea clutter and a rain clutter. Here, the threshold with which target objects, such as a land and another ship, can surely be discriminated, can automatically be set without being affected by whether the target objects exist.

BRIEF DESCRIPTION OF THE DRAWINGS

The present disclosure is illustrated by way of example and not by way of limitation in the figures of the accompanying drawings, in which the like reference numeral indicate like elements and in which.

DESCRIPTION OF EMBODIMENTS

Figure 1:
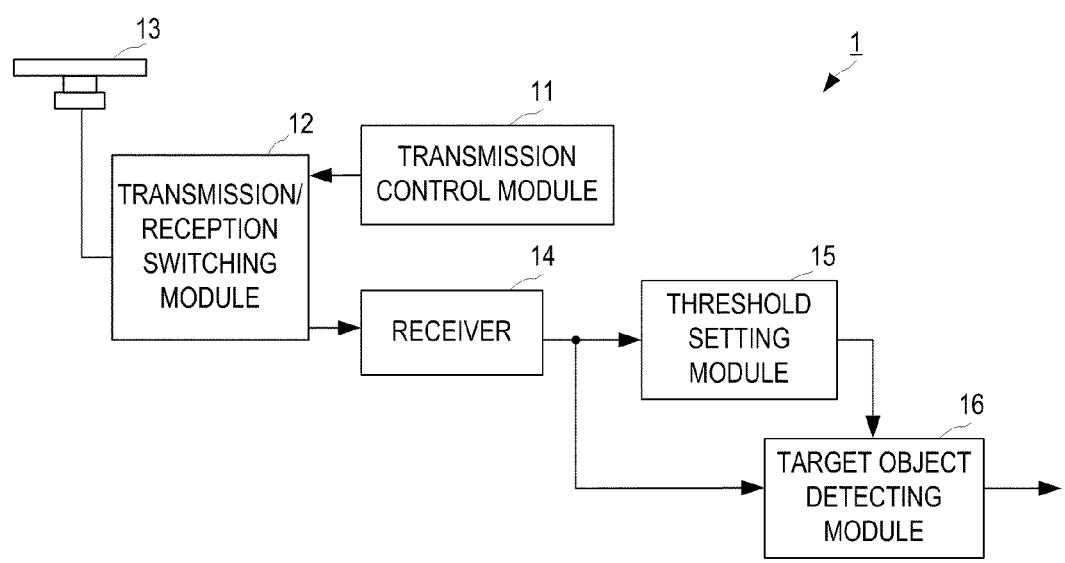
FIG. 1 is a block diagram showing the entire configuration of a target object detection device according to embodiments of the present invention.

Hereinafter, a method of detecting a target object, the method including a method of setting the threshold, and a target object detection device equipped with a threshold setting device according to some embodiments of the present invention are described in detail with reference to the accompanying drawings. FIG. 1 is a block diagram showing the entire configuration of a target object detection device 1 according to the embodiments of the present invention.

First Embodiment

The target object detection device 1 includes a transmission control module 11, a transmission/reception switching module 12, an antenna 13, a receiver 14, a threshold setting module 15 corresponding to a threshold setting device of the invention, and a target object detecting module 16.

The transmission control module 11 generates a pulse shaped transmission signal at every predetermined transmission timing and outputs the transmission signal to the transmission/reception switching module 12. The transmission/reception switching module 12 outputs the transmission signal from the transmission control module 11 to the antenna 13.

The antenna 13 converts the transmission signal into a radio wave and emits outside while revolving at a predetermined revolving speed, and it further receives the radio wave from the outside, converts it into an electric signal to output as a reception signal to the transmission/reception switching module 12. The transmission/reception switching module 12 outputs the reception signal from the antenna 13 to the receiver 14.

The receiver 14 generates echo signals by discretizing the reception signal at a predetermined sampling cycle. Here, the receiver 14 generates the echo signals aligned along a distance direction for every azimuth direction sweep based on azimuth direction information. The receiver 14 outputs the echo signals to the threshold setting module 15 and the target object detecting module 16 in increments of a single sweep. Here, the azimuth direction information is an absolute azimuth direction set based on, for example, azimuth angle information (a particular direction, for example a bow azimuth direction, is a reference azimuth direction) from the antenna 13 and a bow azimuth direction of a ship installed with the target object detection device. Note that, the azimuth direction information may also be applied to the threshold setting module 15 and the target object detecting module 16.

The threshold setting module 15 includes a target object detecting program written with, for example, a target object detecting algorithm (described later), a memory for storing the set thresholds and the echo signals, and a processing calculating module for executing the target object detecting algorithm.

Although the threshold setting module 15 (described in detail later) compares a level of the echo signal (hereinafter, it may simply be referred to as the "echo level") at an observing position to an echo level at a distance position adjacent on the antenna side to the observing distance position on the same sweep. Based on a comparison result, the threshold setting module 15 selects either one of a first threshold setting method (first threshold setting processing) and a second threshold setting method (second threshold setting processing) and updates the threshold adaptive to the threshold ser for the observing distance position. In the first threshold setting method and the second threshold setting method, the threshold is set in a flow different from each other. These threshold setting methods consider a behavior of a sea clutter and a behavior of a rain clutter and can set the threshold according to the behaviors and levels of the clutters. The threshold setting module 15 outputs the set threshold to the target object detecting module 16.

The target object detecting module 16 includes a memory for storing a threshold setting program written with, for example, a threshold setting algorithm, the thresholds and the echo signals transmitted from the threshold setting module 15, and a processing calculating module for executing the threshold setting algorithm. Note that, the target object detecting module 16 may use the same resource as the threshold setting module 15 or may use an individual resource.

The target object detecting module 16 performs target object detection processing based on the echo signals from the receiver 14 and the thresholds corresponding to the echo signals set by the threshold setting module 15. The target object detection processing is, for example, target object determination processing and detection image data formation processing. The target object determination processing determines that when a level of an echo signal at a distance position is higher than a threshold, the echo signal is an echo signal from a target object, and outputs the determination result. The detection image data formation processing suppresses an echo level that is lower than a threshold so as to form image data in which only the echo signal with the level the same as the threshold or higher appears further distinctively.

By performing the above adaptive update of the threshold, the target object can further accurately be detected from the reception signal containing unused components such as clutters, for example a sea clutter and a rain clutter, and a noise. Moreover, by performing the adaptive update of the threshold, the unused components such as the clutters, for example the sea clutter and the rain clutter, and the noise is suppressed and a detection image where an image of the target object further accurately and clearly appears can be generated.

Figure 2:
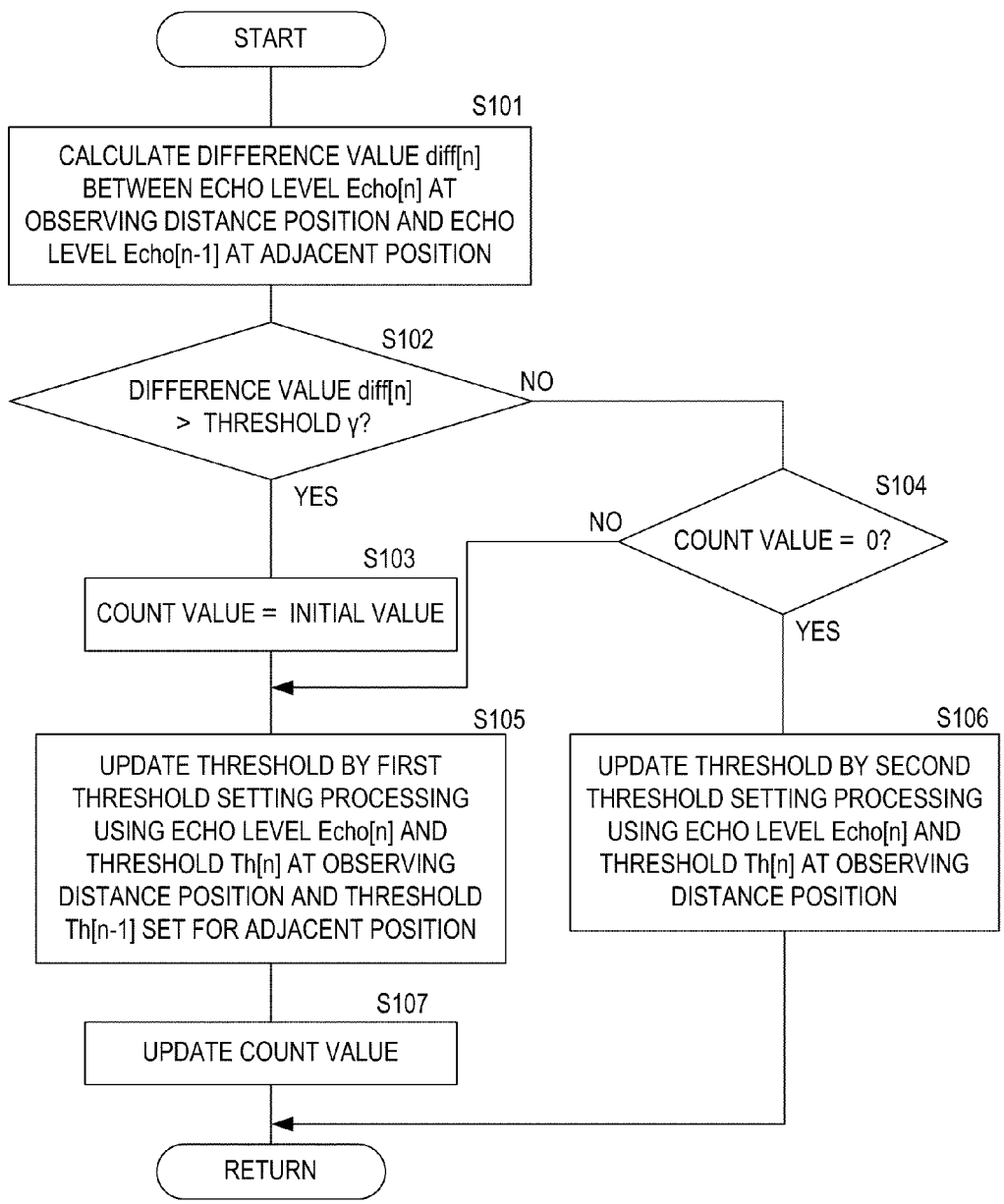
FIG. 2 is a main flowchart of a threshold setting algorithm.
Figure 3:
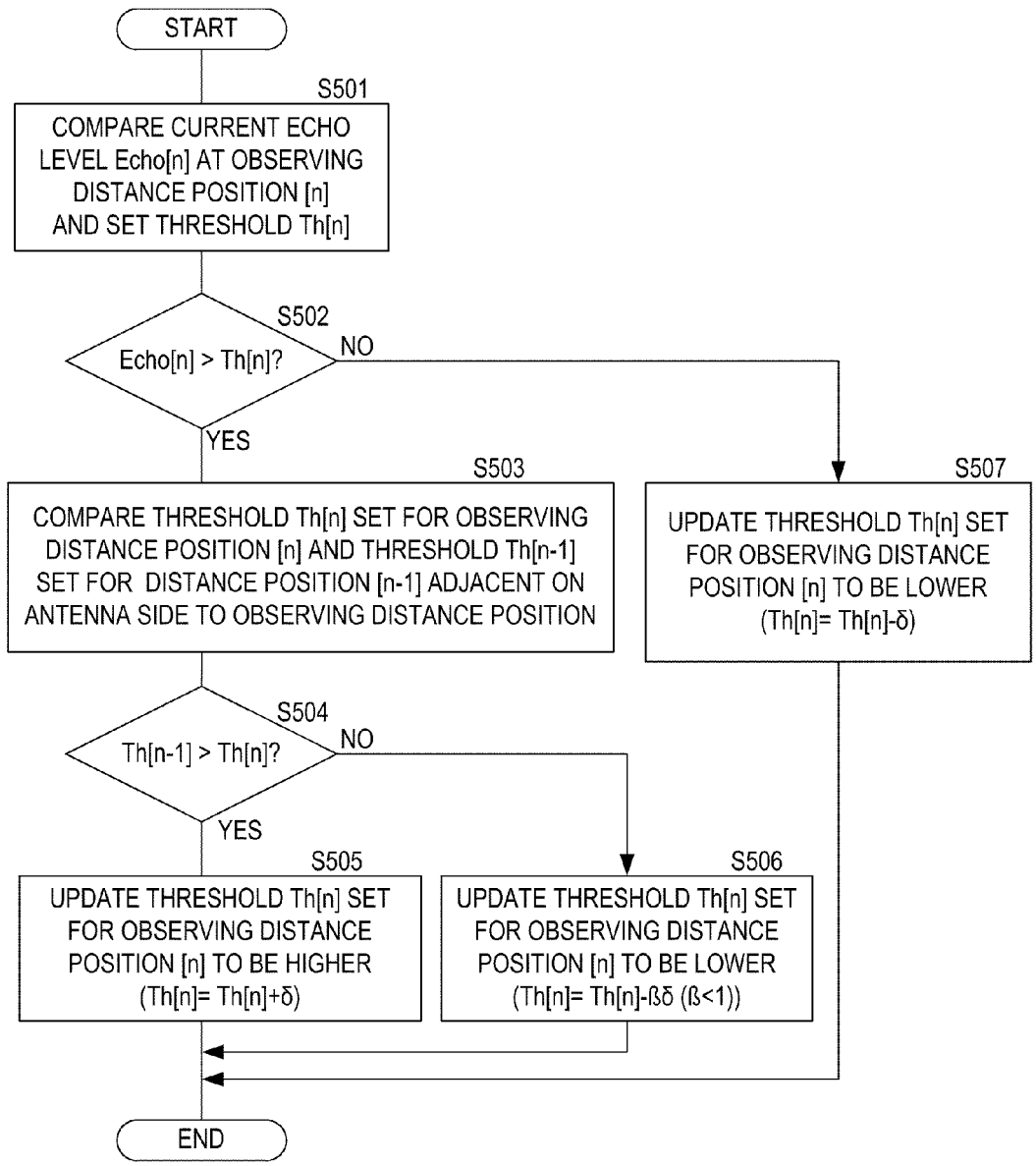
FIG. 3 is a flowchart of first threshold setting processing.
Figure 4A:
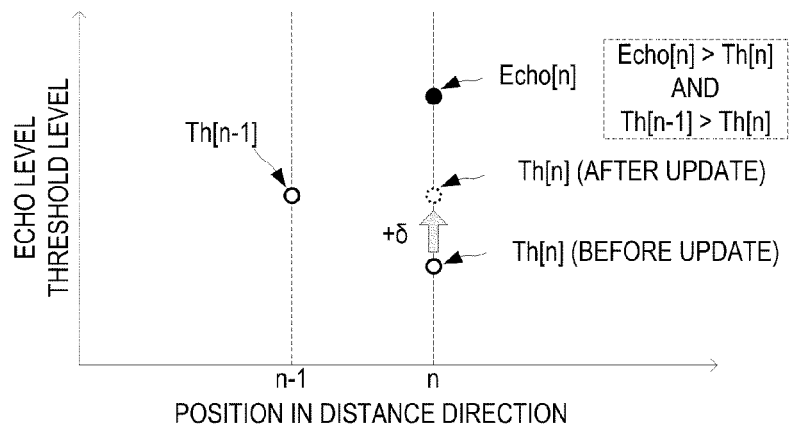
FIGS. 4A to 4C are charts explaining contents of various kinds of threshold setting processing performed in the first threshold setting processing.
Figure 4B:
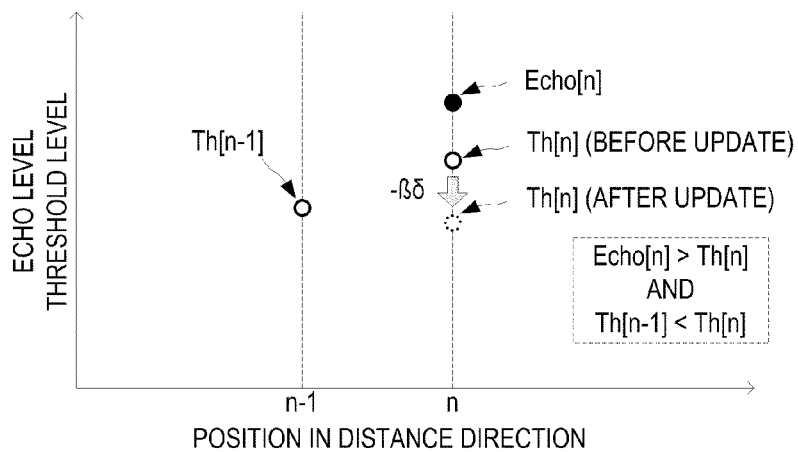
Figure 4C:
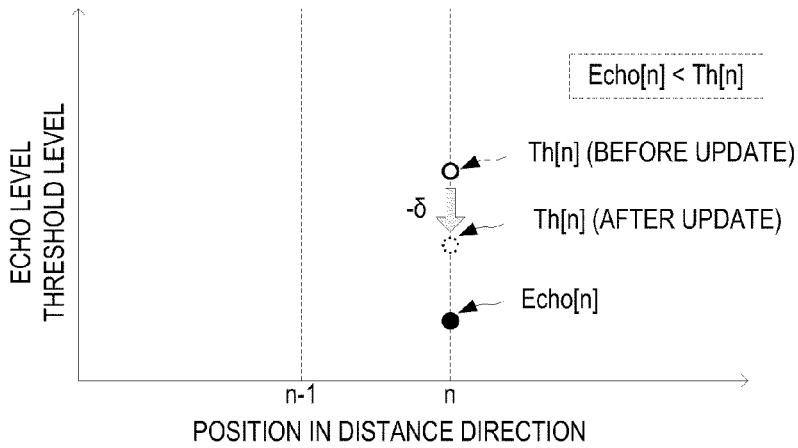
Figure 5:
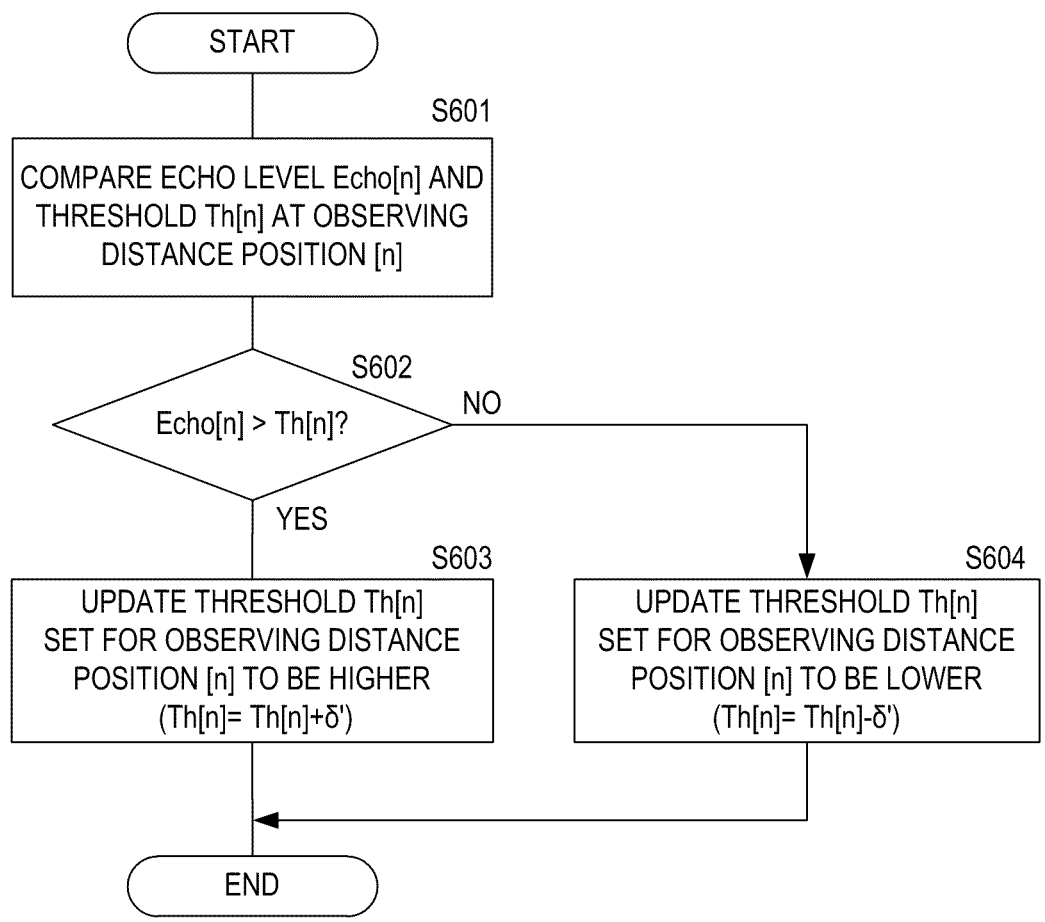
FIG. 5 is a flowchart of second threshold setting processing.
Figure 6A:
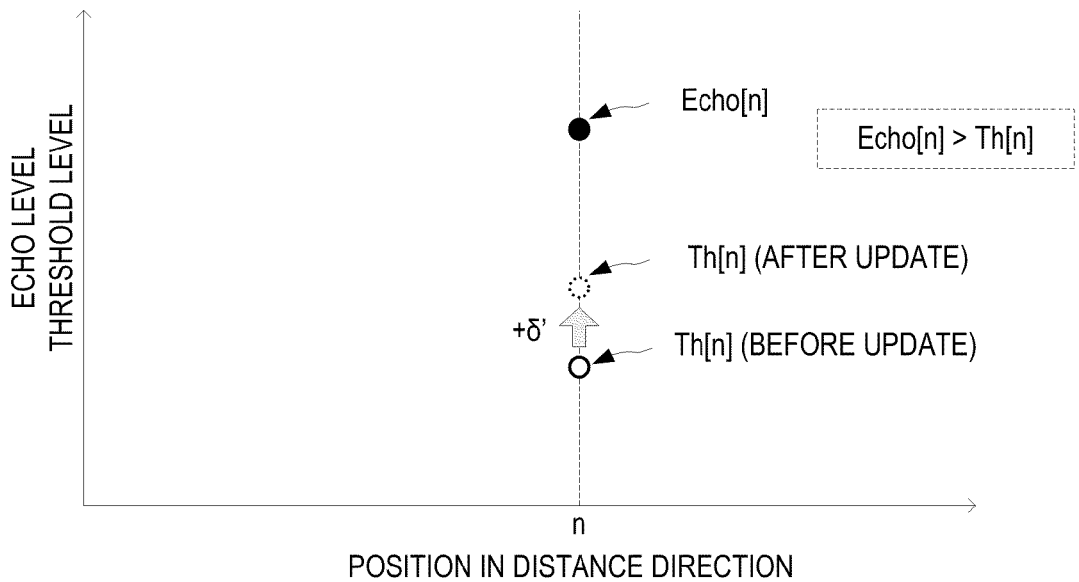
FIGS. 6A and 6B are charts explaining contents of various kinds of threshold setting processing performed in the second threshold setting processing.
Figure 6B:
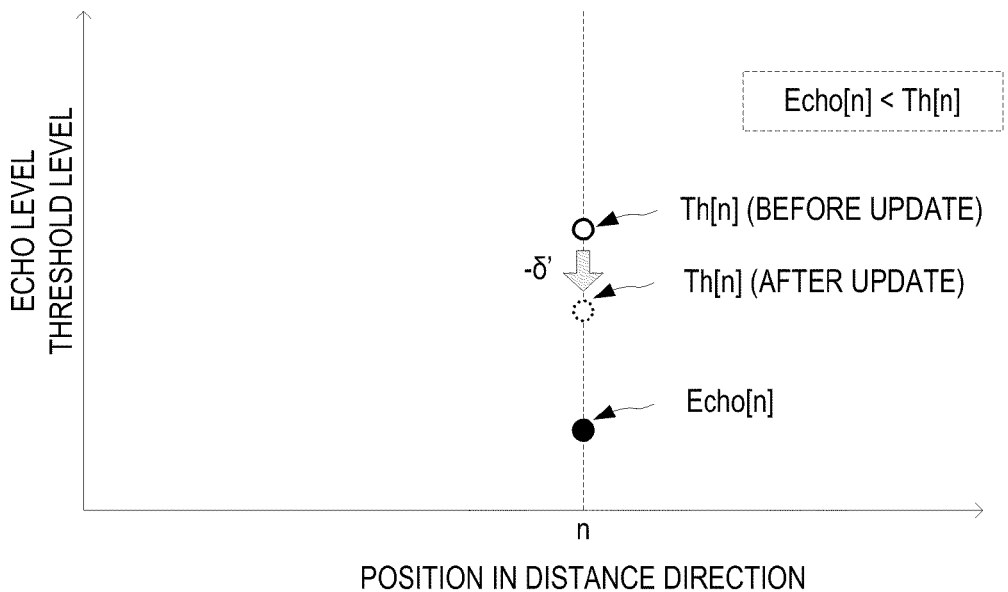

Next, the threshold setting algorithm is described in detail. FIG. 2 is a main flowchart of a threshold setting algorithm. FIG. 3 is a flowchart of the first threshold setting processing. FIGS. 4A to 4C are charts explaining contents of various kinds of threshold setting processing performed in the first threshold setting processing. FIG. 4A is a chart explaining the processing at Step S505 in FIG. 3, FIG. 4B is a chart explaining the processing at Step S506 in FIG. 3, and FIG. 4C is a chart explaining the processing at Step S507 in FIG. 3. FIG. 5 is a flowchart of the second threshold setting processing. FIGS. 6A and 6B are charts explaining contents of various kinds of threshold setting processing performed in the second threshold setting processing. FIG. 6A is a chart explaining the processing at Step S603 in FIG. 5, and FIG. 6B is a chart explaining the processing at Step S604 in FIG. 5.

Note that, in the following description, although only an update of the threshold set for a certain position [n] (observing distance position) in a certain sweep is shown, this update of the threshold is performed for every distance position corresponding to the echo signals configuring a sweep. Further, such setting is continuously performed in every scan. Here, one scan indicates a period of processing the echo signals for one revolution of the antenna. That is, the echo signals for the transmission signals transmitted while the antenna revolves once serve as the echo signals for one scan.

First, an initial value is set for the threshold set for each position. Therefore, the threshold set for a distance position closest to the antenna remains to be the initial value. However, the thresholds set for distance positions other than the distance position closest to the antenna adapt to situations by processing of the following flow.

The threshold setting module 15 acquires an echo level Echo[n] at the observing distance position [n] from the echo signals on the sweep inputted from the receiver 14 and, at the same time, reads an echo level Echo[n−1] at a position [n−1] adjacent on the antenna to the observing distance position [n] (hereinafter, it may simply be referred to as the "adjacent position") on the same sweep.

The threshold setting module 15 calculates a difference value diff[n] between the echo level Echo[n] and the echo level Echo[n−1] based on the following equation (S101 in FIG. 2).

$$\text{diff}[n]=\text{Echo}[n]-\text{Echo}[n-1]$$

The threshold setting module 15 determines whether the difference value diff[n] is larger than a threshold γ. The threshold γ is a constant set beforehand and is set to a value with which the detection of the target object can experimentally or experientially be determined based on a difference between an echo level at a distance position where the target object is detected and an echo level at a distance position adjacent on the antenna side thereto and where the target object is not detected.

When the threshold setting module 15 detects that the difference value diff[n] is larger than the threshold γ (S102: Yes), the threshold setting module 15 sets a count value to an initial value which is not "0" (S103). This initial value is set based on a pulse width of the transmission signal, that is a resolution performance in the distance direction.

When the threshold setting module 15 detects that the difference value diff[n] is the threshold γ or smaller (S102: No), the threshold setting module 15 performs the next processing based on the count value.

When the count value is set to the initial value (S103) or the count value is not "0" (S104: No), the threshold setting module 15 performs an update of the threshold set for the observing distance position [n] by the first threshold setting processing (S105) In the first threshold setting processing (described in detail later), based on the echo level Echo[n] at the observing distance position [n], a threshold Th[n] at the distance position [n], and a threshold Th[n−1] at the adjacent position [n−1], the update of the threshold Th[n] set for the observing distance position [n] is performed.

After the update in the first threshold setting processing, the threshold setting module 15 performs update processing of the count value to reduce by one (S107).

If the count value is "0" (S104: Yes), the threshold setting module 15 performs an update of the threshold set for the observing distance position [n] by the second threshold setting processing (S106). Based on the echo level Echo[n] at the observing distance position [n] and the threshold Th[n] at the distance position [n], the second threshold setting processing (described in detail later) performs the update of the threshold Th[n] set for the observing distance position [n] (S106).

Next, the first threshold setting processing is described. FIG. 3 is the flowchart of the first threshold setting processing. FIGS. 4A to 4C are the charts explaining the contents of the various kinds of threshold setting processing performed in the first threshold setting processing.

The threshold setting module 15 acquires the echo level Echo[n] at the observing distance position [n] and reads the threshold Th[n] set for the observing distance position [n]. The threshold setting module 15 compares the echo level Echo[n] with the threshold level Th[n] (S501).

When the threshold setting module 15 detects that the echo level Echo[n] is larger than the threshold Th[n] (S502: Yes), the threshold setting module 15 reads the threshold Th[n=1] at the adjacent position [n−1] and compares the threshold Th[n] set for the observing distance position [n] to the threshold Th[n−1] at the adjacent position [n−1] (S503).

When the threshold setting module 15 detects that the threshold Th[n=1] at the adjacent position [n=1] is higher than the threshold Th[n] set for the observing distance position [n] (S504: Yes), the threshold setting module 15 performs a correction where a correction value δ is added to the threshold Th[n] set for the observing distance position [n] (S505). That is, for the threshold Th[n] set for the observing distance position [n], calculation processing:

$$Th[n]=Th[n]+\delta \quad (A)$$

is performed. Note that, based on, for example, a relative difference between the echo level of the target object and a noise level, the correction value δ may be set to be smaller than the relative difference by a predetermined level or more.

FIG. 4A is the illustration of this processing. That is, when the echo level Echo[n] at the observing distance position [n] is higher than the threshold Th[n] at the same position and the threshold Th[n] set for the observing distance position [n] is lower than the threshold Th[n−1] at the adjacent position [n−1], the threshold Th[n] set for the observing distance position [n] is increased by δ. This processing is referred to as "A processing."

When the threshold setting module 15 determines that the threshold Th[n−1] at the adjacent position [n−1] is lower than the threshold Th[n] set for the observing distance position [n] (S504: No), the threshold setting module 15 performs a correction where a correction value βδ is subtracted from the threshold Th[n] set for the observing distance position [n] (S506). That is, for the threshold Th[n] set for the observing distance position [n], calculation processing:

$$Th[n]=Th[n]-\beta\delta \quad (B)$$

is performed. Note that, β is set to a real number within a range of 0<β<1 and, by the setting of β, even if the threshold temporarily rises due to processing of increasing the threshold by δ within a later described period of the target object echo, the threshold can gradually be reduced.

FIG. 4B is the illustration of this processing. That is, when the echo level Echo[n] at the observing distance position [n] is higher than the threshold Th[n] at the same position and the threshold Th[n] set for the observing distance position [n] is higher than the threshold Th[n−1] at the adjacent position [n−1], the threshold Th[n] set for the observing distance position [n] is reduced by βδ. This processing is referred to as "B processing."

When the threshold setting module 15 determines that the echo level Echo[n] is lower than the threshold Th[n] (S502: No), the threshold setting module 15 performs a correction where the correction value δ is subtracted from the threshold Th[n] set for the observing distance position [n] (S507). That is, for the threshold Th[n] set for the observing distance position [n], calculation processing:

$$Th[n]=Th[n]-\delta \quad (C)$$

is performed.

FIG. 4C is the illustration of this processing. That is, when the echo level Echo[n] at the observing distance position [n] is lower than the threshold Th[n] at the same position, the threshold Th[n] set for the observing distance position [n] is reduced by δ. This processing is referred to as "C processing."

Next, the second threshold setting processing is described. FIG. 5 is the flowchart of the second threshold setting processing. FIGS. 6A and 6B are the charts explaining the contents of the various kinds of threshold setting processing performed in the second threshold setting processing.

The threshold setting module 15 acquires the echo level Echo[n] at the observing distance position [n] and reads the threshold Th[n] set for the observing distance position [n]. The threshold setting module 15 compares the echo level Echo[n] to the threshold Th[n] (S601). The process up to here is the same as the first threshold setting processing.

When the threshold setting module 15 detects that the echo level Echo[n] is higher than the threshold Th[n] (S602: Yes), the threshold setting module 15 performs a correction where a correction value δ' is added to the threshold Th[n] set for the observing distance position [n] (S603). That is, for the threshold Th[n] set for the observing distance position [n], calculation processing:

$$Th[n]=Th[n]+\delta' \quad (A')$$

is performed. Note that, also based on, for example, the relative difference between the echo level of the target object and the noise level, the correction value δ' may be set to be smaller than the relative difference by the predetermined level or more. Further, the correction value δ' may be set to be larger than the correction value δ in the first threshold setting processing.

FIG. 6A is the illustration of this processing. That is, when the echo level Echo[n] at the observing distance position [n] is higher than the threshold Th[n] at the same position and the threshold Th[n] set for the observing distance position [n] is lower than the threshold Th[n−1] at the adjacent position [n−1], the threshold Th[n] set for the observing distance position [n] is increased by δ'. This processing is referred to as "A' processing."

When the threshold setting module 15 determines that the echo level Echo[n] is lower than the threshold Th[n] (S602: No), the threshold setting module 15 performs a correction where the correction value δ' is subtracted from the threshold Th[n] set for the observing distance position [n] (S604). That is, for the threshold Th[n] set for the observing distance position [n], calculation processing:

$$Th[n]=Th[n]-\delta' \quad (C')$$

is performed.

FIG. 6B is the illustration of this processing. That is, when the echo level Echo[n] at the observing distance position [n] is lower than the threshold Th[n] at the same position, the threshold Th[n] set for the observing distance position [n] is reduced by δ'. This processing is referred to as "C' processing."

Figure 7A:
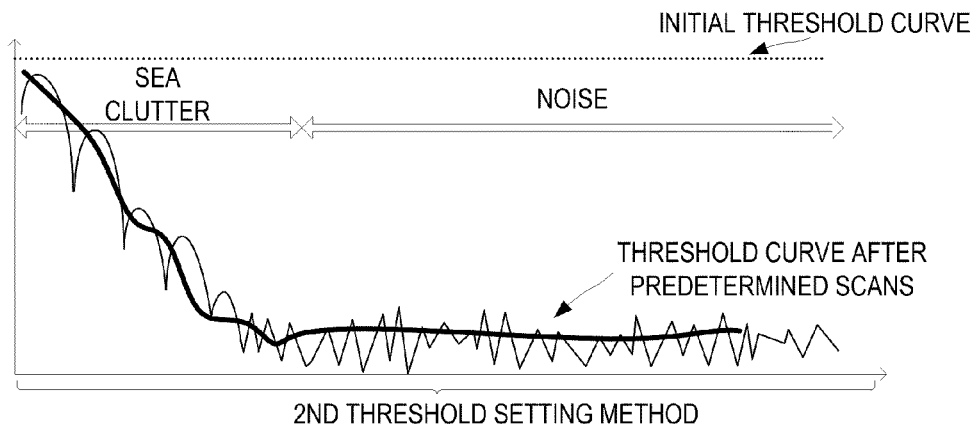
FIG. 7A is a chart showing a curve of a threshold set for each distance position in a case where a target object does not exist and only a sea clutter and a noise exist.
Figure 7B:
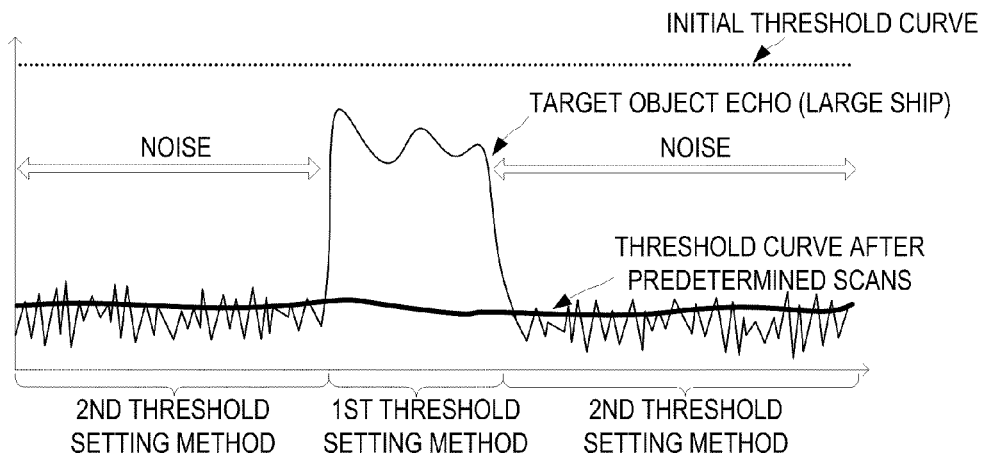
FIG. 7B is a chart showing an adaptation curve of a threshold in a case where the target object exists and the noise exists outside of a target object existing zone.
Figure 7C:
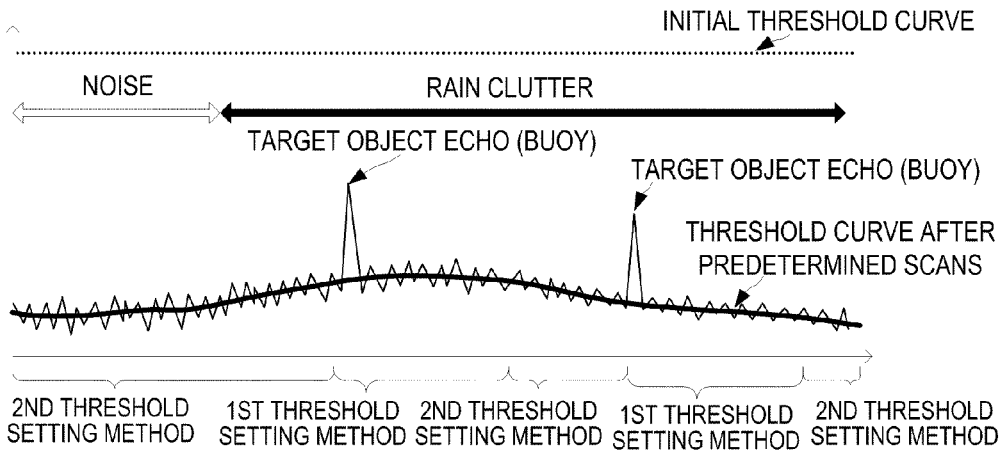
FIG. 7C is a chart showing an adaptation curve of a threshold in a case where a rain clutter exists and the target object exists within the rain clutter.

As described above, by detecting the difference value of the echo levels in the distance direction and selecting either one of the first setting processing and the second setting processing to set the threshold based on the detection result, the threshold can be for each of the distance positions as shown in FIGS. 7A to 7C.

FIG. 7A shows how the thresholds adapt at respective distance positions in a case where the target object does not exist and only a sea clutter and a noise exist. FIG. 7B shows how the thresholds adapt in a case where the target object exists and the noise exists outside of a target object existing zone. FIG. 7C shows how the thresholds adapt in a case where a rain clutter and a noise exist and a small target object exists within the rain clutter. Note that, in FIGS. 7A to 7C, thin solid lines indicate echo data, thick solid lines indicate adapted threshold curves, and thick broken lines indicate initial threshold curves.

(Sea Clutter Occurrence Zone)

In a sea clutter occurrence zone, there are cases where the difference value diff[n] becomes smaller than the threshold γ and larger than the threshold γ. The difference value diff[n] becomes smaller than the threshold γ when a reflection on the sea surface continuously occurs in the distance direction. On the other hand, the difference value diff[n] becomes larger than the threshold γ when the reflection on the sea surface intermittently occurs in the distance direction, such as when a position with large sea surface reflection and small sea surface reflection alternates in the distance direction.

Here, the case where the surface reflection continuously occurs in the distance direction is explained. In this case, the difference value diff[n]<threshold γ is always maintained and the second threshold setting processing is selected.

First, after the update processing of the threshold starts, the C' processing is continuously performed over successive scans until the threshold reaches near the level of the sea clutter, and the threshold gradually falls.

Next, when the threshold falls to near an average level of the sea clutter, the echo level of the sea clutter may become higher than the threshold. In this case, the A' processing is performed. Here, the echo of the sea clutter has a distance dependency to which the echo level falls sequentially corresponding to the distance from the antenna. Thus, a difference between the levels in different scans is not large as long as the distance position is the same. Therefore, by performing the A' processing as above and continuing the update processing of the threshold for over a plurality of scans, a threshold approximately the same as the average level of the sea clutter is set in the sea clutter occurrence zone. Thereby, as shown in FIG. 7A, a threshold corresponding to the average level of the sea clutter can automatically adaptively be set.

As above, in the sea clutter occurrence zone, the C' processing and the A' processing in the second threshold setting processing are performed, and the A processing, B processing, and C processing in the first threshold setting processing are selected when the difference value diff[n]>the threshold γ. Thereby, the threshold curve is converged to the average level of the sea clutter without the threshold rising within a target object echo area.

(Noise Occurrence Zone)

In the noise occurrence zone, the second threshold setting processing is always selected because the difference value diff[n] never becomes larger than the threshold γ.

Also in the noise occurrence zone, similar to the case of the sea clutter, when the update processing of the threshold starts, the C' processing is continuously performed over successive scans until the threshold reaches near a level of the noise, and the threshold gradually falls.

Next, when the threshold falls to near the level of the noise, a relation between the echo level of the noise and the threshold being higher or lower than each other frequently interchanges. Moreover, the relation hardly becomes the same continuously between the positions adjacent to each other in the distance direction. In this case, the A' processing and the C' processing are performed randomly in substantially the entire noise occurrence zone. Further, the echo level of the noise is also random, and the A' processing is performed only when the level is at the maximum and the C' processing is performed when the level is not at the maximum. Thereby, as shown in FIGS. 7A, 7B and 7C, in the noise occurrence zone, the threshold close to an average level of the noise can automatically adaptively be set.

(Target Object Echo Existing Zone)

As shown in FIG. 7B, the echo level of the target object is high compared to the echo level of the noise and maintained high continuously in the distance direction. Therefore, the threshold adapts as follows.

At a position at boundary of the noise and the target object, the difference value diff[n]>the threshold γ. Thereby, the processing for the update of the threshold is switched to the first threshold setting processing starting from this position while the second threshold setting processing is used on the antenna side of this position. Note that, in the situation shown in FIG. 7B, because the difference value diff[n] does not become higher than the threshold γ after the second threshold setting processing is performed twice in the same sweep, the processing is switched to the first threshold setting processing in a zone with its distance length equivalent to the count value from the boundary position. On the other hand, if the difference value diff[n] becomes higher than the threshold γ prior to the count value becoming "0", the adaptive zone of the first threshold setting processing is extended.

As above, in the target object existing zone in a state where the threshold setting processing is selected, first, similar to the zones of the sea clutter and noise, after the update processing of the threshold starts, the C processing is continuously performed over successive scans until the threshold reaches near the echo level of the target object, and the threshold gradually falls.

Next, the B processing is applied in a boundary section between the noise echo on the antenna side of the target object echo and the target object echo adjacent to the noise echo so as to gradually decrease the thresholds of the target object at the distance positions in the boundary section in connection with the thresholds further decreasing at the distance positions of the noise echo. Correspondingly, the thresholds set for the respective farther distance positions within the target object echo area decrease. This is because in the B processing, at each observing distance position, when comparing the threshold set for the observing distance position and the threshold set for the distance position adjacent on the antenna side to the observing distance position where the threshold set for the observing distance position is lower, the threshold set for the observing distance position is correspondingly decreased. Thereby, the threshold becomes substantially the same level as in the noise occurrence zone even within the target object echo area.

Here, the threshold set for the adjacent distance position may be larger than the threshold set for the observing distance position due to the noise level on the antenna side of the target object echo. In this case, the A processing is performed and, thereby, the threshold becomes higher. However, as described above, the A processing is not continuously performed because the noise level is not constant, that is the A processing and the B processing are suitably performed. Therefore, as a result, the threshold becomes substantially the same level as in the noise occurrence zone even within the target object echo area.

(Rain Clutter Occurrence Zone)

The above example describes the case where the rain clutter does not exist. Next, a rain clutter occurrence zone is described in detail.

Although an echo of a rain clutter behaves substantially the same as the above noise in a short distance zone, in the zone where the rain clutter occurs, an echo level is entirely higher than in the zone where no rain clutter occurs. Further, in a boundary area between the zone where the rain clutter occurs and the zone where no rain clutter occurs, the level changes gradually.

Therefore, when the target object echo does not exist, within the rain clutter occurrence zone and the boundary area between the rain clutter occurrence zone and the zone where no rain clutter occurs, the difference value diff[n]>the threshold γ is not satisfied and the second threshold setting processing is always performed.

Thereby, the processing similar to in the noise occurrence zone is performed by performing the second threshold setting processing as above. Here, if the selection by using the difference value diff[n] is not performed and the first threshold setting method is applied, the B processing is performed in the rain clutter occurrence zone. The performance of the B processing causes the threshold to adapt to the noise level even in the rain clutter occurrence zone. Therefore, as a result, the echo of the rain clutter remains.

However, by selecting the second threshold setting processing so as not to perform the B processing, the threshold increases according to the echo level of the rain clutter with respect to the noise occurrence zone and the threshold adapts to the level of the rain clutter. Thereby, as shown in FIG. 7C, the threshold corresponding to the level of the rain clutter is set.

Here, if a target object exists in the rain clutter occurrence zone, the processing is switched to the first threshold setting processing similar to the case of changing from the noise occurrence zone to the zone of the target object echo. In this case, as shown in FIG. 7C, the threshold of the target object echo adapts to the level of the rain clutter right before the target object echo. Therefore, even in such zone where the rain clutter exists, the threshold corresponding to the level of the rain clutter is set without being affected by the echo level of the target object.

Thereby, by using the threshold setting processing of this embodiment, the threshold can automatically adaptively be set corresponding to the levels of the unused components, for example the levels of the plurality of clutters, such as the sea clutter and the rain clutter, and the level of the noise, without being affected by the existence of the target object. Further, by using the optimized threshold, the further accurate target object detection processing can be performed as described above.

Figure 8:
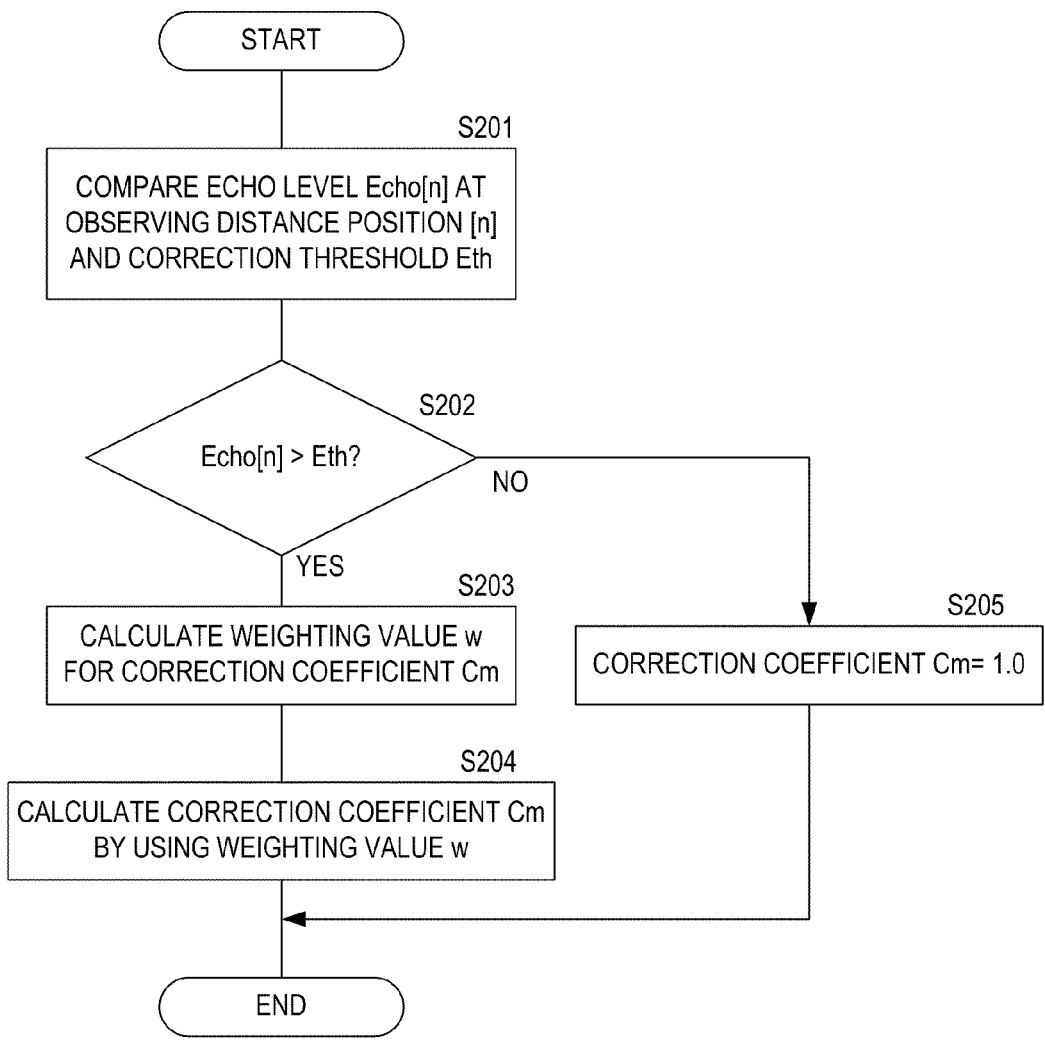
FIG. 8 is a flowchart showing correction processing of a difference value diff[n]

Note that, the example in which the difference value diff[n] is compared to the threshold γ as it is described above; however, the comparison with the threshold γ may be performed after correcting the difference value diff[n] according to the echo level. FIG. 8 is a flowchart showing correction processing of the difference value diff[n].

After the threshold setting module 15 acquires the echo level Echo[n] at the observing distance position [n], it compares the echo level Echo[n] with a difference value correction threshold Eth set in advance (S201). If the echo level Echo[n] is the difference value correction threshold Eth or lower (S202: No), the threshold setting module 15 sets a correction coefficient Cm to "1.0" (S205). That is, the difference value diff[n] is used as it is.

If the echo level Echo[n] is higher than the difference value correction threshold Eth (S202: Yes), the threshold setting module 15 calculates a weighting value w for the correction coefficient Cm based on the following Equation 1 (S203).

$$w = (\text{Echo}[n] - E\text{th}) / (\text{Echo}_{MAX} - E\text{th}) \quad (1)$$

In Equation 1, $\text{Echo}_{MAX}$ is a maximum value of the echo level that can be observed by the target object detection device.

The threshold setting module 15 calculates the correction coefficient Cm by substituting the weighting value w into the following Equation 2 (S204).

$$Cm = w \times Cm_{min} + (1.0-w) Cm_{max} \quad (2)$$

In Equation 2, $Cm_{max}$ is a maximum correction coefficient set by the threshold setting module 15 and $Cm_{min}$ ($<Cm_{max}$) is a minimum correction coefficient set by the threshold setting module 15, and they are suitably set in advance according to specifications of the threshold setting module 15.

The threshold setting module 15 multiplies the calculated correction coefficient Cm by the difference value diff[n] and then compares the multiplied correction coefficient Cm with the threshold γ.

By performing the correction processing of the difference value diff[n] as above, the difference value is corrected to be larger as the echo level becomes higher. Thereby, the target object echo can easily be detected. Note that, the correction processing of the difference value diff[n] is not limited to this, and another method may be applied as long as the difference value is corrected to be larger as the echo level becomes higher.

Further, the case where the correction value δ for being used in the update of the threshold is constant is described above; however, the correction value δ may be set, for example, comparatively larger from the initial setting of the threshold until a predetermined plurality times of scans are performed. Because the threshold approaches the level of the sea clutter or the noise faster by setting the correction value δ larger, an adapting speed of the setting can be increased.

Moreover, the example in which the correction (update) of the threshold is performed through adding or subtracting by the correction value δ is described above; however, the correction (update) of the threshold may be performed through multiplying or dividing by converting δ into a correction coefficient.

Figure 9A:
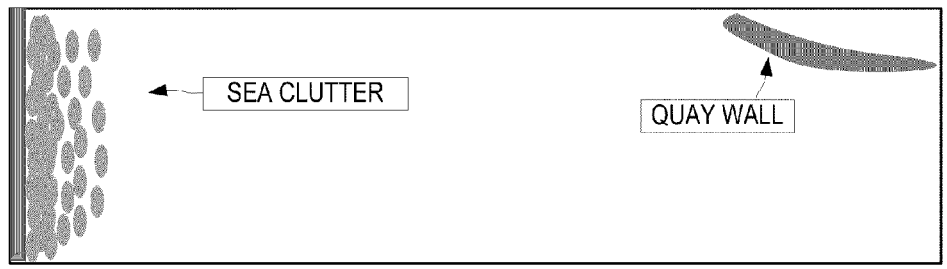
FIG. 9A is a view showing a detection image created by using the conventional method in a case where a sea clutter and a quay wall (land) exist.
Figure 9B:
FIG. 9B is a view showing a detection image created by using a method according to the embodiment in a case where the sea clutter and the quay wall (land) exist.
Figure 9C:
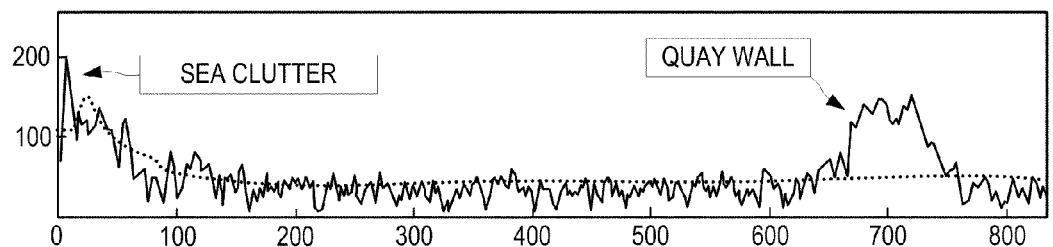
FIG. 9C is a chart showing thresholds adapted to echo levels by utilizing the method of this embodiment.
Figure 10A:
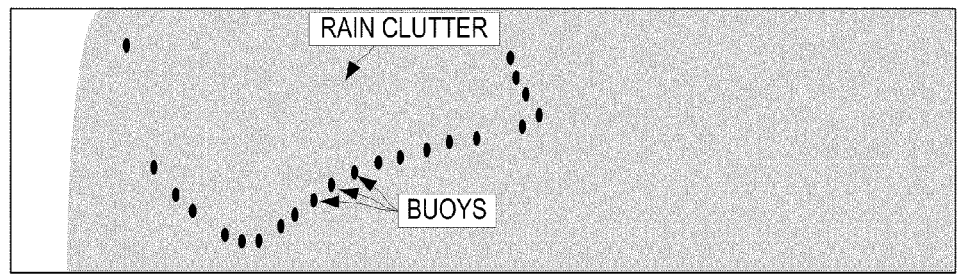
FIG. 10A is a view showing a detection image created by using the conventional method in a case where a rain clutter and a plurality of buoys exist.
Figure 10B:
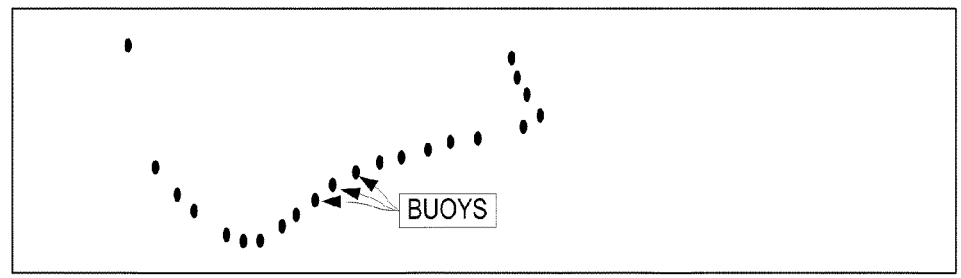
FIG. 10B is a view showing a detection image created by using the method according to the embodiment in a case where the rain clutter and the plurality of buoys exist.
Figure 10C:
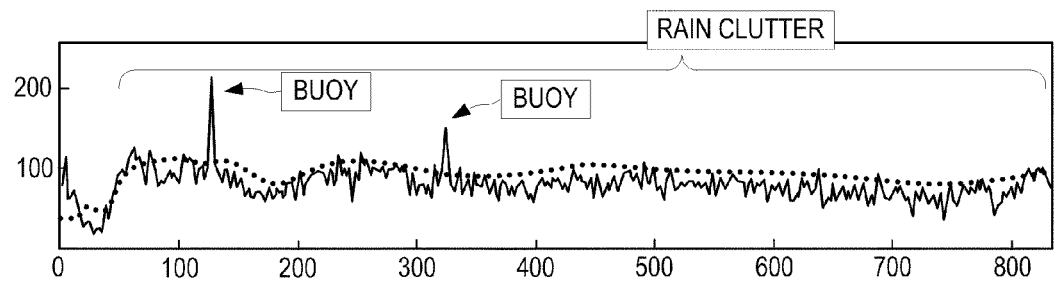
FIG. 10C is a chart showing thresholds adapted to echo levels by utilizing the method of this embodiment.

Further, effects as shown in FIGS. 9A to 9C and 10A to 10C can be obtained by utilizing the above described configurations and performing the above described processing. FIGS. 9A to 9C and 10A to 10C are views and charts showing the effects when the adaptive threshold setting processing of this embodiment is performed, respectively. FIGS. 9A and 10A are detection images showing echo data as it is. FIGS. 9B and 10B are detection images where the echoes having a level of the threshold or lower is suppressed by performing the adaptive threshold setting processing according to this embodiment. FIGS. 9C and 10C are charts showing echo data and threshold curves in an azimuth direction indicated by the solid line in FIGS. 9A and 10A, respectively. Moreover, the views and chart in FIGS. 9A to 9C show the case where a sea clutter and a quay wall (land) exist, and the views and chart in FIGS. 10A to 10C show the case where a rain clutter and a plurality of buoys exist.

By performing the adaptive threshold setting processing according to the embodiment, as shown in FIGS. 9A to 9C, a threshold can automatically be set according to a level of the sea clutter and a level of the noise without being affected by an echo of a land and a large ship even in a zone where the land and the large ship exist.

Moreover, by performing the adaptive threshold setting processing according to the embodiments, as shown in FIGS. 10A to 10C, a threshold can automatically be set according to a level of the rain clutter. Furthermore, even if a small target object, such as a buoy, exists within a rain clutter area, the echo of the target object can surely be discriminated without the target object images becoming unrecognizable within the rain clutter.

Thereby, the detection images where only the sea clutter and the rain clutter are suppressed while leaving the land (large target object) and the buoy (small target object) unaffected as shown in FIGS. 9B and 10B and not the detection images where the sea clutter and the rain clutter remain along with the land and the buoy similar to the case using the conventional art as shown in FIGS. 9A and 9A can surely be created.

Second Embodiment

Next, a method of detecting a target object, the method including a method of setting the threshold, and a target object detection device equipped with a threshold setting device according to a second embodiment of the present invention is described in detail with reference to the accompanying drawings. In the method of setting the threshold, the setting of the threshold in an azimuth direction is described.

The method of setting the threshold according to the first embodiment is the method of adapting the thresholds set for respective distance positions along the same azimuth direction. Here, the antenna revolves as above and the target object detection device usually performs the target object detection for the entire periphery. Therefore, by performing the adaptation processing of the threshold for every azimuth direction (i.e., every sweep data), the adaptation processing of the threshold can be performed for the entire periphery. However, in this embodiment, the thresholds for the entire periphery are set by another method utilizing the adaptation processing of the threshold for a particular azimuth direction in the first embodiment.

Figure 11:
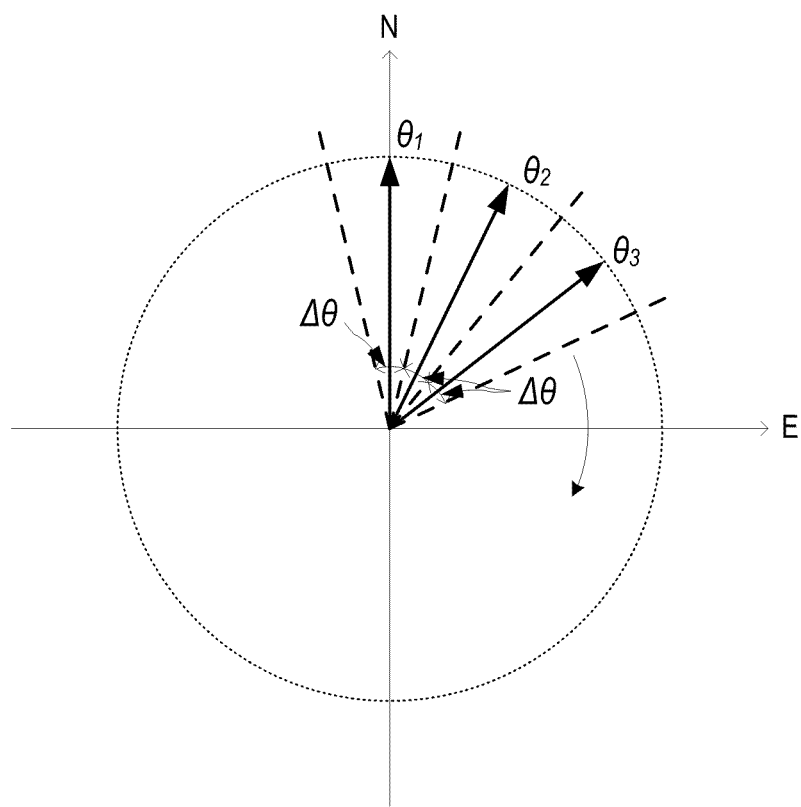
FIG. 11 is a view showing a concept in setting particular azimuth directions.

First, as shown in FIG. 11, a plurality of particular azimuth directions are set every predetermined angle along an azimuth angle direction following the rotation direction of the antenna 13. FIG. 11 is a view showing a concept in setting the particular azimuth directions.

The particular azimuth directions are obtained by dividing entire peripheral angle (360°) by every predetermined azimuth direction angle (Δθ) starting from a 0° direction (reference direction) toward north as an absolute azimuth direction. The threshold setting module 15 stores such particular azimuth directions $\theta_1, \theta_2, \ldots$ in advance.

When the threshold setting module 15 acquires echo signals on a sweep in the particular azimuth direction, the threshold setting module 15 performs update of thresholds set for respective distance directions by using the method in the first embodiment. For example, when the threshold setting module 15 acquires echo signals on a sweep in the particular azimuth direction $\theta_1$, the threshold setting module 15 performs update of thresholds $Th_1$ at respective distance positions, and when the threshold setting module 15 acquires echo signals on a sweep in the particular azimuth direction $\theta_2$, the threshold setting module 15 performs update of thresholds $Th_2$ at respective distance positions.

Figure 12A:
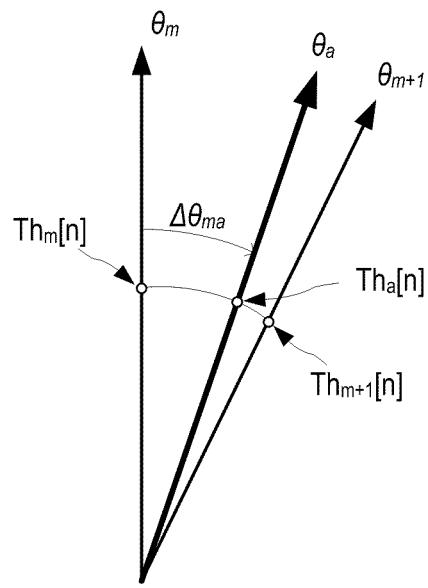
FIG. 12A is a view explaining a method of interpolation calculation of thresholds in individual azimuth directions and 12B is a chart explaining a method of interpolation calculation of thresholds in individual azimuth directions.
Figure 12B:
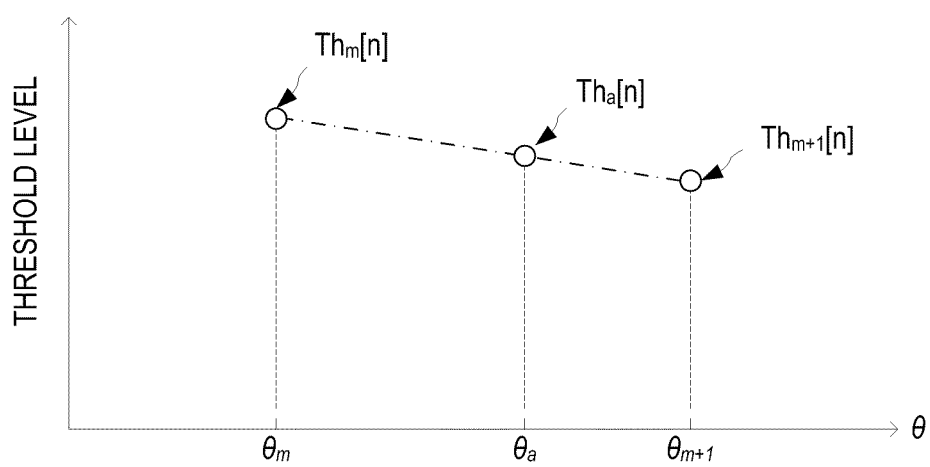

Next, the threshold setting module 15 performs an interpolation calculation for threshold in an individual azimuth direction between two particular azimuth directions by using the thresholds in two particular azimuth directions sandwiching the individual azimuth direction. FIGS. 12A and 12B are a view and a chart explaining a method of interpolation calculation of the thresholds in each of the individual azimuth directions, in which FIG. 12A shows an example of a spatial relation between the particular azimuth direction and the individual azimuth direction and FIG. 12B is a view showing a concept in setting the threshold of the individual azimuth direction.

When calculating a threshold $Th_a[n]$ at a distance position [n] in an individual azimuth direction $\theta_a$, the threshold setting module 15 first acquires the individual azimuth direction $\theta_a$ from the absolute azimuth direction which is obtained along with the echo signals on the sweep as above. Further, the threshold setting module 15 calculates an azimuth direction angle difference $\Delta\theta_{ma}$ between a particular azimuth direction $\theta_m$ closest to the individual azimuth direction $\theta_a$ in counter-clockwise and the individual azimuth direction $\theta_a$.

The threshold setting module 15 acquires two thresholds $Th_m[n]$ and $Th_{m+1}[n]$ set for the observing distance position [n] in particular azimuth directions $\theta_m$ and $\theta_{m+1}$, respectively. The threshold setting module 15 calculates the threshold $Th_a[n]$ set for the distance position [n] in the individual azimuth direction $\theta_a$ by using the concept in the interpolation calculation as shown in FIG. 12B based on the following equation.

$$Th_a[n]=(\Delta\theta_{ma}/\Delta\theta)\times Th_m[n]+(1-\Delta\theta_{ma}/\Delta\theta)\times Th_{m+1}[n]$$

The threshold setting module 15 performs the interpolation calculation processing at respective distance positions in the individual azimuth direction $\theta_a$. Thereby, the update of the thresholds set for the respective distance positions in the entire peripheral direction can be performed and the processing in the first embodiment is not required to be performed for all the distance positions in each of the entire peripheral direction by using this method. Thus, the entire processing can be reduced in load and increased in speed. Here, the sufficiently accurate setting of the threshold can practically be performed by using the above processing. In the practical use, the sea clutter is, for example, a reflection of a wave and the rain clutter is, a reflection of rain within an area where it rains. Note that, the echo of the wave or rain appears with a certain amount of width. Therefore, by suitably setting the predetermined azimuth angle $\Delta\theta$ between the particular azimuth directions, the threshold reflecting a state of the wave or the rain can sufficiently be set without performing the adaptation threshold setting processing to all the azimuth directions. Similarly, because a target object echo also has a predetermined width, the similar operation effect as in the case of the sea clutter or the rain clutter can be obtained.

Note that, as above, by using the single resource for the threshold setting module 15 and the target object detecting module 16, the result of comparing the level of the echo data and the threshold for the threshold setting can be used for the target object detection processing as it is. Thereby, the threshold setting processing and the target object detection processing are partially unified, and the further simple and high-speed processing can be achieved for the target object detection device.

Further, the example in which the thresholds from the single scan are compared is described above; however, when comparing the threshold set for the observing distance position and the threshold set for the distance position adjacent on the antenna side, the threshold set for the distance position adjacent on the antenna side which is already performed with the update for the next scan may be used.

Moreover, the example in which the processing according to the embodiments of the present invention is applied to the radar apparatus equipped on the ship is described; however, the present invention may be applied to any devices as long as the device transmits a predetermined detection signal and acquire its echo signal.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The teems "comprises," "comprising," "has," "having," "includes," "including," "contains," "containing" or any other variation thereof, are intended to cover a non-exclusive inclusion, such that a process, method, article, or device that comprises, has, includes, contains a list of elements does not include only those elements but may include other elements not expressly listed or inherent to such process, method, article, or device. An element proceeded by "comprises . . . a," "has . . . a," "includes . . . a," "contains . . . a" does not, without more constraints, preclude the existence of additional identical elements in the process, method, article, or device that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A method of setting a threshold according to a level of an echo signal of an unused component, the echo signals being generated by transmitting and receiving a radio wave with an antenna while the antenna revolves, the method comprising:

calculating a difference value between a level of the echo signal at an observing position and a level of the echo signal at a second position located between the observing position and the antenna and closer to the observing position than to the antenna;

selecting a process for setting a threshold from either one of a first threshold setting process and a second threshold setting process according to the calculated difference value; and updating the threshold set for the observing position by using the selected threshold setting processing wherein the first threshold setting process includes decreasing the threshold set for the observing position when the level of the echo signal at the observing position is below the threshold set for the observing position;

increasing the threshold set for the observing position when the level of the echo signal at the observing position is above the threshold set for the observing position and the threshold set for the second position is above the threshold set for the observing position; and decreasing the threshold set for the observing position when the level of the echo signal at the observing position is above the threshold set for the observing position and the threshold set for the second position is below the threshold set for the observing position.

2. A method of setting a threshold according to a level of an echo signal of an unused component, the echo signals being generated by transmitting and receiving a radio wave with an antenna while the antenna revolves, the method comprising:
calculating a difference value between a level of the echo signal at an observing position and a level of the echo signal at a second position located between the observing position and the antenna and closer to the observing position than to the antenna;
selecting a process for setting a threshold from either one of a first threshold setting process and a second threshold setting process according to the calculated difference value such that the first threshold setting process is selected when the difference value is above the threshold and the second threshold setting process is selected when the difference value is below the threshold; and
updating the threshold set for the observing position by using the selected threshold setting processing;
wherein, when the first threshold setting process is selected, the updating the threshold includes updating the threshold set for the observing position based on the level of the echo signal at the observing position, the threshold set for the observing position, and a threshold set for the second position; and
wherein, when the second threshold setting process is selected, the updating the threshold includes updating the threshold set for the observing position based on the level of the echo signal at the observing position and the threshold set for the observing position; and
wherein the first threshold setting process includes
decreasing the threshold set for the observing position when the level of the echo signal at the observing position is below the threshold set for the observing position;
increasing the threshold set for the observing position when the level of the echo signal at the observing position is above the threshold set for the observing position and the threshold set for the second position is above the threshold set for the observing position; and
decreasing the threshold set for the observing position when the level of the echo signal at the observing position is above the threshold set for the observing position and the threshold set for the second position is below the threshold set for the observing position.

3. The method of claim 2, wherein the second threshold setting process includes:
decreasing the threshold set for the observing position when the level of the echo signal at the observing position is below the threshold set for the observing position; and
increasing the threshold set for the observing position when the level of the echo signal at the observing position is above the threshold set for the observing position.

4. The method of any one of claims 1, 2 or 3, wherein the calculating the difference value includes correcting the difference value according to the level of the echo signal at the observing position; and
wherein the selecting the threshold setting process includes selecting the threshold setting process based on the corrected difference value.

5. The method of claim 4, wherein the difference value is corrected to be larger as the level of the echo signal at the observing position is higher.

6. The method of claim 5, wherein the difference value is corrected by a weighted addition of a maximum value and a minimum value of the level of the echo signal by using a weight coefficient corresponding to the level of the echo signal at the observing position.

7. The method of claim 1, further comprising:
updating a threshold along a distance direction in parallel to a discharging direction of the radio wave having the antenna as a reference position, for a plurality of particular azimuth directions set every predetermined azimuth angle along a revolving direction of the antenna; and
interpolating the threshold along the distance direction in an individual azimuth direction different from the particular azimuth directions based on the thresholds set for two of the particular azimuth directions interposing the individual azimuth direction therebetween.

8. The method of claim 7, wherein the interpolating the threshold includes weighting with azimuth angle differences between the individual azimuth direction and the two particular azimuth directions, the thresholds set for the two particular azimuth directions at the same distance position.

9. A method of detecting a target object, comprising:
the method of setting the threshold of claim 1; and
determining that the echo signal with a level above the set threshold is an echo signal of the target object.

10. A method of detecting a target object, comprising:
the method of setting the threshold of claim 1; and
creating detection image data from which the echo signal with a level below the set threshold is suppressed.

11. A non-transitory computer-readable medium having embodied thereon a program which, when executed by a processor, causes the processor to carry out a method for setting a threshold according to a level of an echo signal of an unused component, the echo signals being generated by transmitting and receiving a radio wave with an antenna while the antenna revolves, the method comprising:
calculating a difference value between a level of the echo signal at an observing position and a level of the echo signal at a second position located between the observing position and the antenna and closer to the observing position than to the antenna;
selecting, a process for setting a threshold from either one of a first threshold setting process and a second threshold setting process according to the calculated difference value; and
updating the threshold set for the observing position by using the selected threshold setting processing
wherein the first threshold setting process includes
decreasing the threshold set for the observing position when the level of the echo signal at the observing position is below the threshold set for the observing position;
increasing the threshold set for the observing position when the level of the echo signal at the observing position is above the threshold set for the observing position and the threshold set for the second position is above the threshold set for the observing position; and
decreasing the threshold set for the observing position when the level of the echo signal at the observing position is above the threshold set for the observing position and the threshold set for the second position is below the threshold set for the observing position.

12. The medium of claim 11, wherein selecting includes selecting the first threshold setting process when the difference value is above the threshold and selecting the second threshold setting process when the difference value is below the threshold;
- wherein, when the first threshold setting process is selected, updating includes updating the threshold set for the observing position based on the echo signal at the observing position, the threshold set for the observing position, and a threshold set for the second position; and
- wherein, when the second threshold setting process is selected, updating includes updating the threshold set for the observing position based on the level of the echo signal at the observing position and the threshold set for the observing position.

13. The medium of claim 11 or 12, the method further comprising:
- determining that the echo signal with a level higher than the set threshold is an echo signal of a detected target object.

14. The medium of claim 11 or 12, the method further comprising:
- creating detection image data from which the echo signal with a level lower than the set threshold is suppressed.

15. A target object detection device, comprising:
- an antenna for transmitting and receiving a radio wave to generate echo signals;
- a threshold setting module for setting a threshold according to a level of an echo signal of an unused component received by the antenna; and
- a target object detecting module for detecting a target object by using the threshold and the echo signals, wherein the threshold setting module includes:
  - a difference value calculating module for calculating a difference value between a level of the echo signal at an observing position and a level of the echo signal at a second position located between the observing position and the antenna and closer to the observing position than to the antenna;
  - a setting method selecting module for selecting a process for setting a threshold from either one of a first threshold setting process and a second threshold setting process according to the calculated difference value; and
  - a threshold updating module for updating the threshold set for the observing position by using the selected threshold setting process.

16. The target object detection device of claim 15, wherein the setting method selecting module selects the first threshold setting process when the difference value is above the threshold and selects the second threshold setting process when the difference value is below the threshold;
- wherein, the threshold updating module updates, when the first threshold setting process is selected, the threshold set for the observing position based on the level of the echo signal at the observing position, the threshold set for the observing position, and a threshold set for the second position; and
- wherein, the threshold updating module updates, when the second threshold setting process is selected, the threshold set for the observing position based on the level of the echo signal at the observing position and the threshold set for the observing position.

17. A method of claim 1, the method further comprising: reducing a level of an echo signal whose level is under the threshold.

* * * * *